United States Patent [19]

Speidel

[11] Patent Number: 5,146,541

[45] Date of Patent: Sep. 8, 1992

[54] SIGNAL PHASE PATTERN SENSITIVE NEURAL NETWORK SYSTEM AND METHOD

[75] Inventor: Steven L. Speidel, San Diego, Calif.

[73] Assignee: The United States of America as represented by the Secretary of the Navy, Washington, D.C.

[21] Appl. No.: 368,504

[22] Filed: Jun. 19, 1989

[51] Int. Cl.$^5$ ............................................. G06F 15/18
[52] U.S. Cl. ......................................... 395/21; 395/24; 364/133
[58] Field of Search .............. 364/200, 900, 133, 513, 364/213.9, 273-277, 972, 972.1-972.4

[56] References Cited

U.S. PATENT DOCUMENTS 4,737,929  4/1988  Denker ........................... 364/133 X
4,796,199  1/1989  Hammerstrom et al. ........... 364/513
4,850,027  7/1989  Kimmel ........................... 364/133 X

FOREIGN PATENT DOCUMENTS 0038405  9/1985  Japan .................................. 364/133

Primary Examiner—Bernarr E. Gregory
Attorney, Agent, or Firm—Harvey Fendelman; Thomas Glenn Keough

[57] ABSTRACT

A signal phase pattern sensitive neural network system can discern persistent patterns of phase in a time varying or oscillatory signal. The system employs duplicate inputs from each of its sensors to the processing elements of a first layer of its neural network, with the exception that one input is phase shifted relative to the other. The system also employs a modification of a conventional Kohonen competitive learning rule which is applied by the processing and learning elements of a second layer of its neural network.

10 Claims, 4 Drawing Sheets

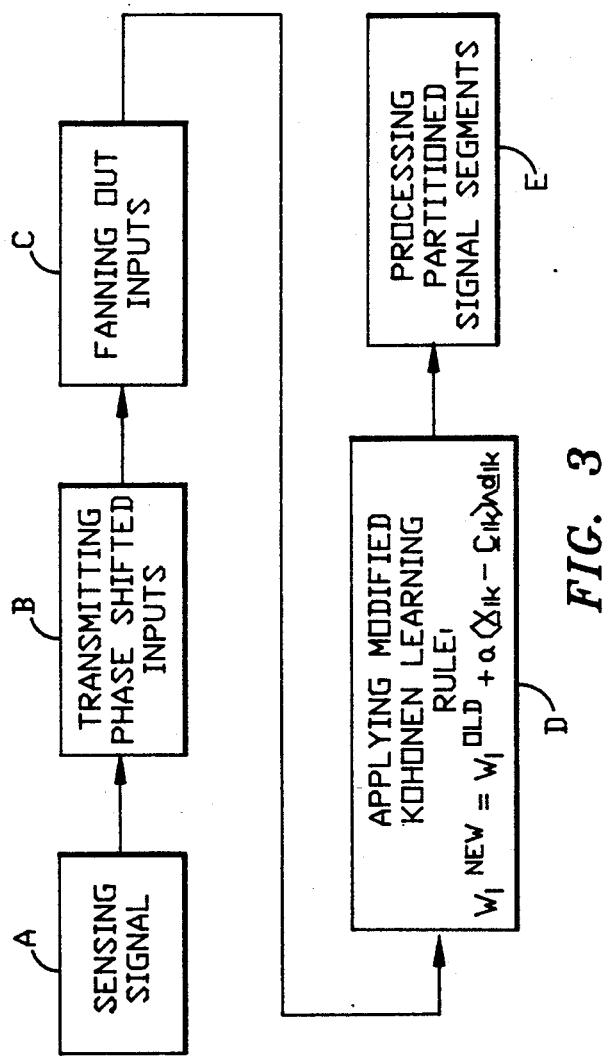
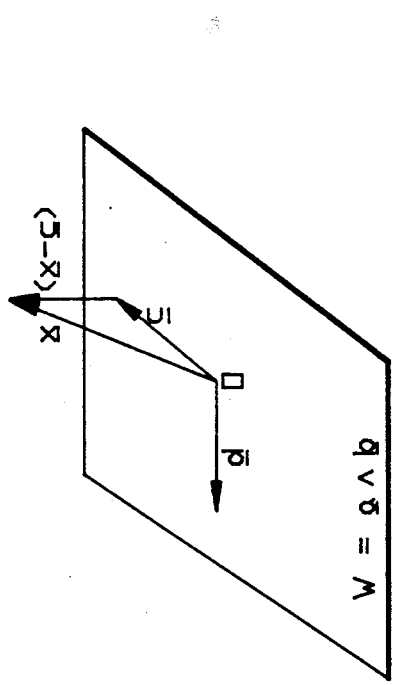
FIG. 3
FIG. 4

SIGNAL PHASE PATTERN SENSITIVE NEURAL NETWORK SYSTEM AND METHOD

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention generally relates to parallel sensing and processing of signals and, more particularly, to a signal phase pattern sensitive neural network system and method for discerning persistent patterns of phase in time varying excitation.

An artificial neural network is a network of highly interconnected processing elements (PE's) which accomplish parallel processing and, to some extent, distributed processing. The neural network can be coupled with an array of sensors to form an artificial neural system for sensing and processing signals wherein learning and adapting occur in a way thought to simulate the human brain.

A typical neural network system is composed of multiple layers. In a layer of the neural network system where learning occurs, the layer is characterized by the fact that all the member PE's of the layer have the same learning rule. For example, consider the conventional neural network system 10 illustrated in FIG. 1. First layer 12 merely acts as a "fan-out" layer, connecting each sensor 14 with each member PE of second layer 16. No competition nor learning occurs in first layer 12.

The PEs of second layer 16 compete with one another. By way of example, competition between second layer PEs can occur in accordance with a learning rule that is known as the Kohonen competitive learning rule and is set out in detail in the text *Self-Organization and Associative Memory* by T. Kohonen, Springer-Yerlag, Germany, 1984. The Kohonen competitive learning rule provides for competition between PEs of second layer 16 on the basis of the equation:

$$I_i = \sum_{j=1}^{n} w_{ij}x_j = w_i \cdot x$$

The winner among PEs updates itself (or adjusts its weight) in accordance with the equation:

$$\dot{W}_i = \alpha(x - w_i)z_i$$

where x is typically a signal vector, W is a connectivity strength or weight vector which is modified during learning by the quantity $W_i$ for the ith PE, and alpha is a heuristically chosen learning constant.

Although each PE of second layer 16 operates locally upon the inputs it receives, only the winning PE, i.e., the one whose connection strength pattern most closely matches the incoming signals, is allowed to adapt. The connection strength patterns associated with the PEs form win regions or sectors for each PE in the manner of Kohonen competitive learning.

Heretofore, neural networks have been applied to preprocessed signals which are expressed as intensities or base-banded amplitude envelopes. However, there is growing interest in applying neural network technology to real world signals, for instance, to improve performance of weapon sensory systems (passive and active) against low Doppler targets, targets employing countermeasures, and targets in areas of high environmental noise.

SUMMARY OF THE INVENTION

The present invention relates to a signal phase pattern sensitive neural network system and method for discerning persistent patterns of phase in time varying or oscillatory excitation The novel features of the system of the present invention over the above-described conventional neural network system relate to (1) the provision of duplicate inputs from each sensor to the neural network except that one input is phase shifted relative to the other, and (2) the modification of the conventional Kohonen competitive learning rule applied by the processing elements of the second layer of the neural network. These features permit real-time, simultaneous detection of multiple, statistically significant phase patterns embedded in a time varying, or oscillatory, signal, for instance, a target signal masked in background or environmental signals.

OBJECTS OF THE INVENTION

Accordingly, it is the primary object of the present invention to provide a novel neural network system and method which achieves, simultaneously and in parallel, the formation of a set of bi-vectors which represent the phase pattern statistics (the probability density function of phase patterns) across an array of multiple sensors Another object of the present invention is to provide a novel neural network system and method which employs phase shifted inputs to make evident a phase pattern characteristic of the signals incident across the multiple sensor array.

Still another object of the present invention is to provide a novel neural network system and method which employs a modified Kohonen competitive learning rule that allows a statistical partitioning or classification of the received signal pattern among the PEs of the layer employing the modified learning rule.

Other objects, advantages and novel features of the invention will become apparent from the following detailed description of the invention when considered in conjunction with the accompanying drawings.

BRIEF DESCRIPTION OF THE DRAWINGS

FIG. 3 is a block diagram of a signal phase pattern sensitive neural network method in accordance with the present invention.

FIG. 4 is a diagrammatic representation of a bi-vector plane (W) and input vector (x) employed by a modified Kohonen competitive learning rule in accordance with the present invention.

DETAILED DESCRIPTION OF THE INVENTION

Figure 1:
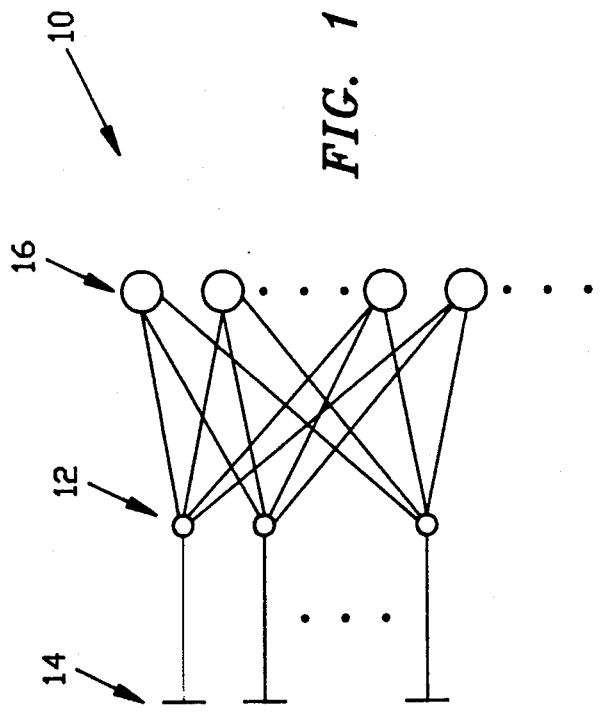
FIG. 1 is a diagrammatic representation of a conventional neural network system.
Figure 2:
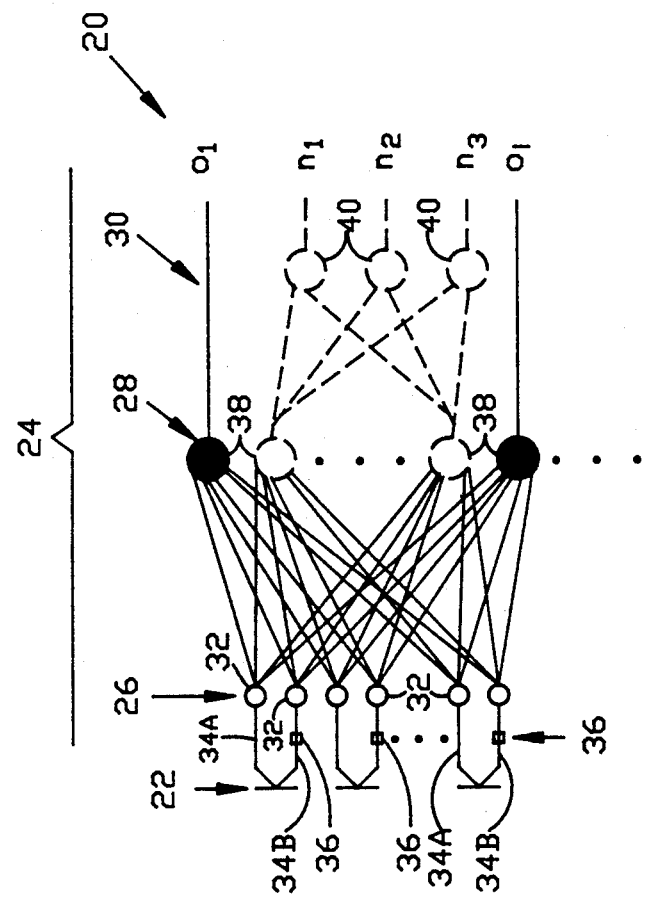
FIG. 2 is a diagrammatic representation of a signal phase pattern sensitive neural network system in accordance with the present invention.

Referring now to the drawings, and particularly to FIGS. 2 and 3, there is shown respective diagrammatic representations of the signal phase pattern sensitive neural network system 20 and method of the present invention. System 20 of the present invention is capable of discerning persistent patterns of phase in the time fluctuating excitation of a plurality of sensors 22 of system 20. The system can also learn and apply associations of these phase patterns with the directions of propagation of incoming waves and/or provide a beamforming function. In order to perform these functions, system 20 also includes a neural network 24 that is coupled with sensors 22 for sensing and processing signals. Neural network 24 is a network of highly interconnected processing elements (PE s) in first, second and third layers 26, 28 and 30 thereof, which accomplish parallel and, to some extent, distributed processing.

There are two, or a pair of, PEs 32 in first layer 26 for each sensor 22. The inputs from sensors 22 to first layer PEs 32 are analog signals. The PEs 32 of first layer 26 are digitizers, such as analog to digital (A/D) converters, which transform the analog inputs to digital signals for fanout to second layer 28. A pair of conductive leads 34A, 34B interconnect each of sensors 22 with a separate PE 32 of first layer 26.

One input signal is a substantial duplicate of the other except that it is phase shifted, under ideal conditions, by a quarter of a period of either a frequency component, or in the case of a narrowband signal, the center frequency. Lead 34B has a signal delay producing device 36, such as a time delay, interdisposed therein for producing the phase shift of the one input signal relative to the other from the same sensor 22.

The PEs 38 and 40 of second and third layers 28 and 30, respectively, are composed of digital logic circuits. The circuits of PEs 38 and 40 compose part of the circuitry of a general purpose digital computer, for example a Zenith 386 computer, operated by software, such as the computer program set forth in the Appendix. Alternatively, the digital logic circuits of PEs 38 and 40 can be implemented by a dedicated hardware/firmware architecture. Fan out of the digital signals from PEs 32 of first layer 26 to PEs 38 of second layer 28 is achieved by a bus 42 which provides the conductive leads connecting PEs 32 in first layer 26 with each of a plurality of PEs 38 in second layer 28.

This technique of providing phase shifted inputs makes evident a phase pattern characteristic of the signals across the array of sensors 22. It is also recognized in accordance with the inventive concept that by forming combinations of shifted and non-shifted signals, network PEs 38 of second layer 28 are capable of combining the sensor input signals with arbitrary relative phase. Array signals are presented to the neural network 24 in a manner which allows spatial sector discrimination by multi-phasic response to the sensor outputs. In the case where a system is processing narrowband signals or a frequency component of a signal, phasing among the PEs 32 of the first layer 26 may be accomplished by using the fact (trigonometric identity) that $$\omega A_i (\cos \omega t + \phi_i + \phi) =$$

-continued
$$\omega A_i \left[ \cos(\omega t + \phi_i)\cos\phi + \cos\left(\omega t + \phi_i + \frac{\pi}{2}\right)\sin\phi \right]$$

Taking the initial signal from the ith sensor, $\Psi_i$, to be $A_i\cos(\omega t + \phi_i)$, the above expression may be rewritten as $$\omega_i \Psi_\phi = \omega_i \cos\phi \Psi_i + \omega_i \sin\phi \omega_i \pi/2 \text{ or}$$
$$\omega_i \Psi_\phi = \omega_i' \Psi_i + \omega_i'' \Psi_i \pi/2$$

where,
$\Psi_i = A_i\cos(\pi t + \phi_i) =$ weighted sensor signal,
$\Psi_i \pi/2 = A_i\cos(\omega t + \phi_i + \pi/2) = -A_i\sin(\omega t + \phi_i) =$ signal shifted by phase angle $\pi/2$,
$\Psi_{i\phi} = A_i\cos(\omega t + \phi_i + \phi) =$ phase shifted element signal.
The neural network 24 is fabricated to have weights $w_i'$ and $w_i''$ in order to accommodate the sensor array inputs. Thus, the neural network 24 will be able to direct the array spatial response.

PEs 38 of second layer 28 are appropriately fabricated and interconnected to use a modified Kohonen competitive learning rule, in accordance with this inventive concept and as set forth in detail in the software of the computer program contained in the Appendix, to capture relative phase information in the sensed input signals. This modified learning rule allows for a statistical partitioning or classification of the received patterns of phase. Though each of PEs 38 of second layer 28 operates locally upon the inputs it is receiving, only the winning PE, i.e., the one whose connection strength pattern most closely matches the phase pattern of the incoming signals, is allowed to adapt. The connection strength patterns associated with PEs 38 form win regions or sectors for each PE in the manner of the modified form of the Kohonen competitive learning rule.

In contrast to its conventional form, the modified form of the Kohonen learning rule involves operations, to be described later on, which allow for processing of oscillatory signals in a manner which becomes sensitive to the relationship of the signal vector to a connectivity or weight plane or bi-vector in the multidimensional weight space. This capability allows the modified rule to respond particularly to the phase pattern feature of the signal vectors.

Thus, the finite population of open and solid PEs 38 in second layer 28, seen in FIG. 2, try to form a statistically optimal representation of the perhaps infinite number of received patterns Both use the same modified learning rule to capture the phase pattern and both have the same inputs. The distinction is that some are connected to the third layer 30 to act as what has come to be known as outstar sources which are developed thoroughly in the text *Studies of Mind and Brain* by S. Grossberg, D. Reidel Publishing Company, Boston, 1982. The outstar sources and other sources identified by Grossberg are used for beamforming output (through conjugation of the adapted weights). These are two examples of the purposes served by statistical capture of phase patterns. A detailed discussion of second layer operation rules follows this general discussion.

PEs 40 of third layer 30 of neural network 24 compose the boundaries of Grossberg outstars which learn according to the well-known Grossberg learning rule as set out in the Grossberg text. Second layer PEs 38 serve as the "sources" of these outstars. The appropriate outstar (or outstars) is activated when its source (an output from second layer 28) wins a competition. Those of PEs 40 serving as Grossberg outstars operate in two modes: (1) a learning or training mode and (2) a processing mode.

During learning, appropriate values are presented to the outputs of the third layer 30 simultaneously with the presentation of inputs at first layer 26. Each of PEs 38 adjust their response to inputs according to the modified learning rule. When operating in the processing mode, the PEs output the responses that they learned to associate with the particular source PE which is active at any given time. Thus, third layer 30 completes a pattern-to-pattern association—the particular signal array phase pattern is won by a PE in second layer 28 which subsequently activates a learned pattern in third layer 30. In this case, the third layer pattern has been trained to be the three direction cosines.

Given the above-described makeup of neural network system 20 of the present invention, the method of the invention is carried out in accordance with the steps represented by blocks A-E in FIG. 3. Block A represents the first step of sensing a signal emanating from an environment of interest, such as an environment containing a target signal. Block B represents the second step of transmitting the inputs of the signal sensed at each sensor 22 to each of the pairs of PEs 32 in the first layer 26 such that one input is phase shifted by a predetermined amount relative to the other. Block C represents the third step of fanning out the pairs of inputs from first layer PEs 32 to second layer PEs 38. Block D represents the fourth step of selecting and learning different segments of the sensed signal at second layer 28, in response to the inputs to the second layer PEs 38, in accordance with the modified Kohonen learning rule for partitioning the signal into the different segments. Block E represents the fifth step of transmitting the different partitioned signal segments from second layer PEs 38 to third layer PEs 40 where processing of the different partitioned signal segments takes place to identify a desired characteristic of the sensed signal, such as its directionality.

The functioning of second layer 28 is unique and a more detailed description of it now follows with reference to FIGS. 2-4. Given N sensors, the 2N inputs received by each PE 38 of second layer 28 are conceptualized, for the purpose of concise description, as components of a 2N component vector x. Since the excitation is a propagating wave, the pattern of amplitudes across sensors 22 will not remain fixed although the direction of incidence does.

In order to deal with the cyclical fluctuation, the input vector x may be considered to be rotating or oscillating in a plane in the 2N dimensional space if it is maintaining a set relative phase pattern. Proof of this relationship is as follows. When a sinusoidal excitation is applied at a sensor 22 (FIG. 2), two vector components $u_i, v_i$ are formed at the input to the neural network 24:

$$u_i = \cos(\omega t + \Delta_i) \quad (1)$$

$$v_i = \sin(\omega t + \Delta_i) \quad (2)$$

Thus, for the entire sensor array of n sensors 22 the input vector x is:

$$x = (u_1, v_1, u_2, v_2, \ldots, u_n, v_n) \quad (3)$$

where x is a function of time. At sample times $t_1, t_2, t_3$ the input vectors are:

$$x_1 = x(t_1) = (\cos\theta_1, \sin\theta_1, \cos\theta_2, \ldots) \quad (4)$$

$$x_2 = x(t_2) = (\cos(\theta_1 + \Delta_1), \sin(\theta_1 + \Delta_1), \cos(\theta_2 + \Delta_1), \ldots) \quad (5)$$

$$x_3 = x(t_3) = (\cos(\theta_1 + \Delta_1 + \Delta_2), \sin(\theta_1 + \Delta_1 + \Delta_2), \cos(\theta_2 + \Delta_1 \Delta_2)) \quad (6)$$

It may be shown that the vectors $x_1, x_2, x_3$ fall in a plane by showing that the third is linearly dependent on the first and second. To do this, the components of $x_3$ are expanded as follows:

$$u_{31} = \cos(\theta_1 + \Delta_1 + \Delta_2) = \cos(\theta_1 + \Delta_1)\cos\Delta_2 - \sin(\theta_1 + \Delta_1)\sin\Delta_2 \quad (7)$$

also $$\sin(\theta_1 + \Delta_1) = \sin\theta_1 \cos\Delta_1 + \sin\Delta_1 \cos\theta_1 \quad (8)$$

and $$\cos(\theta_1 + \Delta_1) = \cos\theta_1 \cos\Delta_1 - \sin\theta_1 \sin\Delta_1 \quad (9)$$

$$\sin\theta_1 = \left(\frac{1}{\sin\Delta_1}\right)[\cos\theta_1 \cos\Delta_1 - \cos(\theta_1 + \Delta_1)] \quad (10)$$

Therefore, substituting equations (8) and (10) into (7), $$u_{31} = \eta_{31} u_{11} + \eta_{32} u_{21},$$

where $n_{31}, n_{32}$ are constants, and, by induction, $$u_{ij} = \eta_{i1} u_{1j} + \eta_{i2} u_{2j}$$

Similarly, it can be shown that $$v_{ij} = \mu_{i1} u_{1j} + \mu_{i2} v_{2j}$$

Thus, any two of the vectors $x(t_k), x(t_l)$ form a basis for all others and the time evolving vectors therefore lie in a plane within the hypersphere.

Further, as seen in FIG. 4, the input sensitivities (W) for each PE's set of inputs describe an additional plane. If the plane of the vector x and the plane of W are the same, then their phase patterns are matched. This fact is taken advantages of in the design of the present invention. During learning, PEs 38 of the second layer 28 adjust their input sensitivity planes (W) to match the planes of the input vectors (x). While doing this, they continually compete in the manner of the modified Kohonen learning rule so that they reserve "win regions" about some particular phase patterns, i.e., each PE's learned W plane is a statistically weighted expectation representing the inputs which it has won.

A similar competition is used in the processing mode as is used in the learning mode. When a given second layer PE 38 wins, it acts as an outstar "source" and a particular Grossberg outstar is invoked. The association of the phase pattern with the direction of the incident wave is accomplished this way and the Grossberg outstars produce the average values of the direction number triples that were presented to them coincidently with associated input vectors at the second layer during training. In FIG. 2, the outstars are indicated by the dashed lines between second and third layers 28 and 30. The solid output lines from the second layer allow for "beam" outputs, i.e., sums of the products of the components of phase conjugate of w and x (the dot product). A "window function" may also be applied for narrowing of the beams.

The phase conjugate is formed to enable the transforming of weights for beamforming in accordance with the following relationships. For beamforming, transform the weights (sensitivities) $\dot{w}$ to vector b, which when multiplied times an input vector x of a particular phase pattern will cause the inputs to add in phase. Given 2N inputs, let $$W = (\omega_1, \omega_1, \omega_2, \omega_2, \ldots, \omega_N, \omega_N)$$

and, for some input pair from the ith sensor, $$\omega_i \Psi_1 + \omega_i \Psi_{i\,\pi/2} = \omega_i \Psi_\phi$$

where,
$\Psi_i$ is the original transduced signal on sensor i,
$\Psi_{i\,\pi/2}$ is the delay signal,
and
$\Psi_{i\phi} = \cos(\omega t + \phi_x)$ is the phase shifted signal.
We want to find b $$b = (b_1, b_1, b_2, b_2, \ldots, b_N, b_N)$$

such that $$b_i \Psi_{i\phi} = \omega_i \{\cos(\omega t + \phi_{ix}) - \phi_{iw}\}$$

where $\phi_{ix} - \phi_{iw}$ is independent of i if the learned pattern matches the incoming one. Expanding, get $$\omega_i[\cos\omega t + \phi_{ix}) - \phi_{iw}] = \{\omega_i\cos(\omega t + \phi_{ix})\cos\phi_{iw} + \omega_i\sin\phi_{iw}\sin(\omega t + \phi_{ix})\} = \left\{ (\omega_i'\Psi + \omega_i''\Psi_{\frac{\pi}{2}})\cos\phi_{iw} + \omega_i\sin\phi_{iw}\left[-\cos\left(\omega t + \frac{\pi}{2}\right)\cos\phi_{ix} + \cos\omega t\sin\phi_{ix}\right]\right\} = \quad (5)$$

$$\{\omega_i'\cos\phi_{iw} + \omega_i''\sin_{iw}\}\Psi_i + \{\omega_i''\cos\phi_{iw} - \omega_i'\sin\phi_{iw}\}\Psi_{i\,\frac{\pi}{2}}$$

Thus, the result is that $$b_i = [\omega_i\cos\phi_{iw} + \omega_i\sin\phi_{iw}]$$

$$b_i = [\omega_i\cos\phi_{iw} - \omega_i\sin\phi_{iw}]$$

The operations of the neural network 20 can be summarized in mathematical form as follows:

Learning

First layer 26: no learning, fanout only.
Second layer 28: learning in accordance with the modified Kohonen competitive learning rule:

$$W_i^{new} = W_i^{old} + \alpha(x_{ik} - c_{ik}) \wedge d_{ik}$$

where $W_i$, is the "weight plane", expressed as a bi-vector, of the ith PE of layer 2, $\alpha$ is the learning rate, $d_{ik} = \overline{x_k \cdot W_i}$ (the bar denotes normalization), $c_{ik}$ is the projection of $x_k$ onto $W_i$, normallized to unit length, and the symbol $\wedge$ denotes the wedge product An alternative form of the learning rule for the second layer 28 is as follows. Given input vector:

$$x = (x'_1, x''_1, x'_2, x''_2, \ldots, x'_N, x''_N)$$

use any pair $(x_j', x_j'')$ as a phase reference $$\tan\phi_{xj} = x''_j/x'_j.$$

For each pair, $$(x'_k, x''_k), k \neq j$$

find $$\Delta_x = 100 \; \phi_{xj} - \phi_{xk}.$$

Likewise, for w, find $$\Delta_w = \phi_{wj} - \phi_{wk}.$$

Form the difference $$\Delta = \lambda(\Delta_w = \Delta_x), 0 < \lambda \leq 1$$

and adjust w according to the formula $$\omega'_k{}^{new} = \omega'_k{}^{old}\cos\Delta + \omega''_k{}^{old}\sin\Delta$$

$$\omega''_k{}^{new} = \omega''_k{}^{old}\cos\Delta - \omega'_k{}^{old}\sin\Delta$$

Third layer 30: Grossberg "outstars" with sources at the second layer as set forth the Grossberg text. For example, $$\dot{x}_i(t) = -\alpha_i x_i(t) + \beta_{li} x_i(t - \tau_{li}) - \Gamma_{li}{}^+ z_{li}(t) + C_i(t)$$

and $$\dot{z}_{li}(t) = -\gamma_{li}(t) + \delta_{li} x_i(t - \tau_{li}) - \Gamma_{li}{}^+ x_i(t)$$

Processing

First layer 26: fanout only
Second layer 28:

$$\text{PE}_i \text{ wins if } |x_k \cdot W_i| > |x_k \cdot W_j|, j \neq i$$

$o_i = \omega_i \cdot x$, where $\omega_i$ is the phase conjugate of $\omega_i$,
Third layer 30: Output learned values of direction numbers (approaches average) according to Grossberg rule.

System 20 of the present invention is not limited to any particular application. By way of example, in a sonar application of system 20, sensors 22 could be piezoelectric crystals, whereas in an application of the system to testing signals in an electrical circuit, sensors 22 could be taps on the circuit paths. As mentioned earlier, PEs 32 of the neural network 24 are A/D converters, whereas PEs 38 and 40 of the neural network 24 are digital circuit portions of a general purpose computer, such as the Zenith 386, directed and controlled by software, such as contained in the Appendix.

The processing elements referred to throughout this application are simulated in the illustrative embodiment in the referred to Zenith computer in accordance with the program of the Appendix. Optionally the processing elements could be fabricated from a plurality of general purpose CPUs, such as the Motorola 68,000 series or Intel 8086 series, that are suitably programmed in accordance with known techniques by one skilled in the art to which the invention pertains to carry out the mathematical operations set forth above. Such implementation by the CPUs or transputers could be carried out without requiring undue experimentation or ingenuity outside of the scope of the teachings of the concept.

Beamforming Test Results

Each of PEs 40 of the bi-vector beamforming (or third) layer 30 is capable of forming a beam. Thus, by setting the number of PEs in the layer, the maximum number of beams is determined. If a large number of PEs are included, then training might not occur on all of them. Just a few of the PEs may continually capture the incoming signal vector depending on the statistics of the incoming signal. For the testing which is described below, five PEs were used, the number being arbitrarily chosen. For the test data which was used, all of the PEs trained at some time during the ping cycle.

Figure 6:
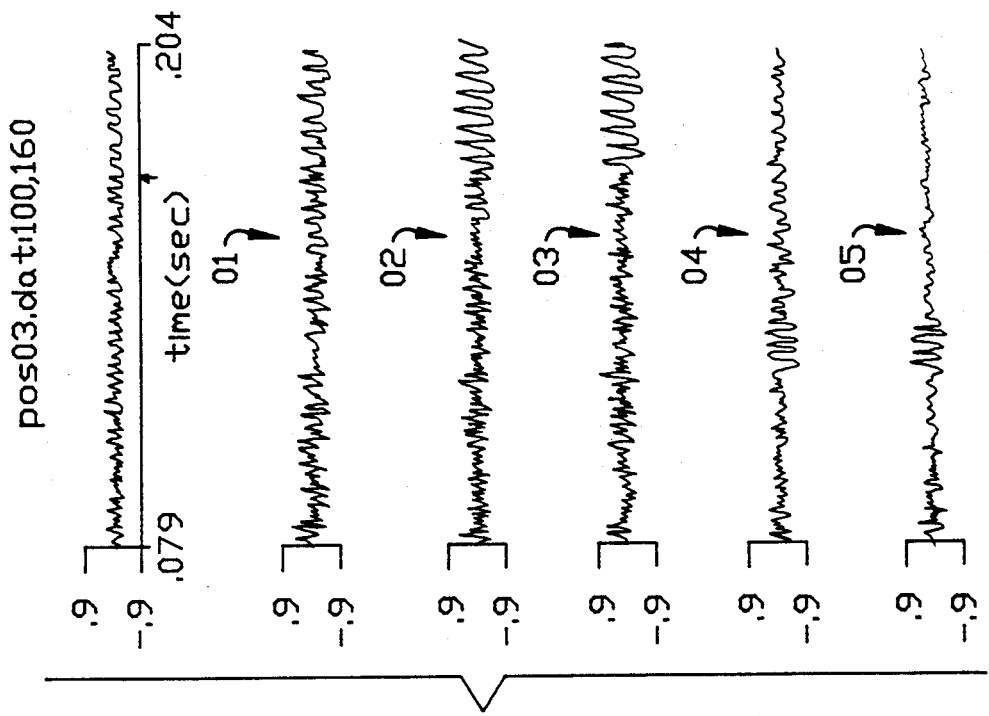
FIG. 6 is a graph of an original signal incident on one sensor and the processed signals derived from the PEs of the layer applying the modified competitive learning rule of the present invention.
Figure 5:
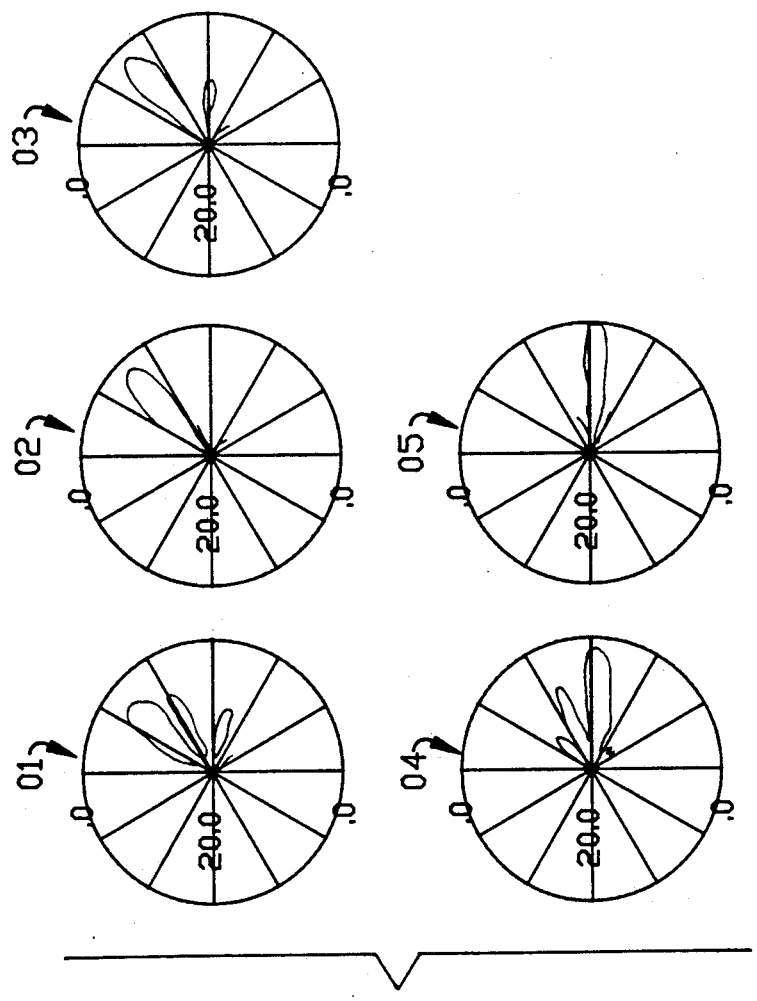
FIG. 5 is a graph of beamforming results of the testing of the system of the present invention.
Figure 7:
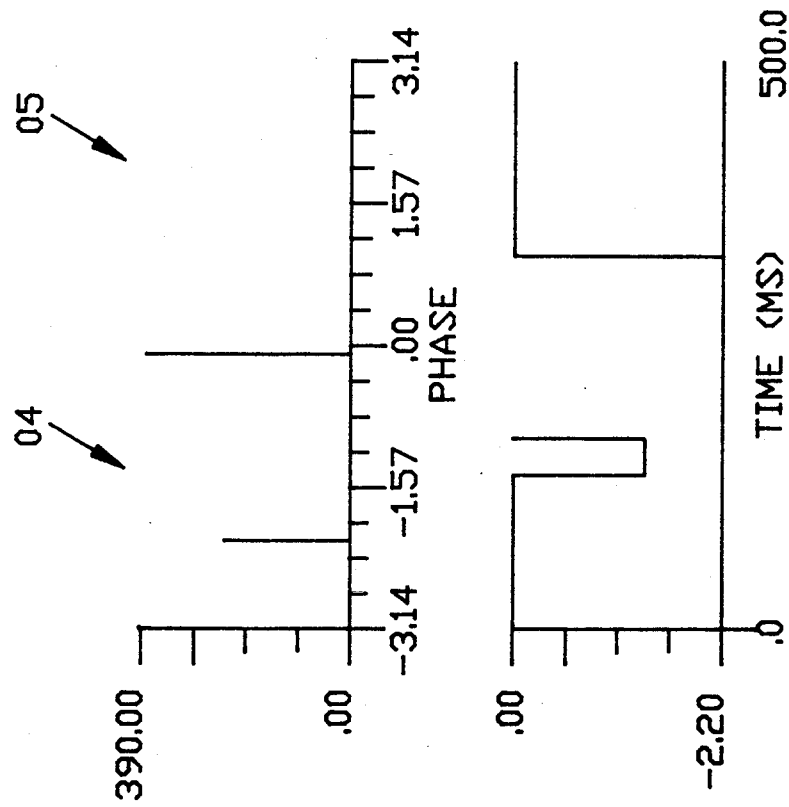
FIG. 7 is a graph of synthetic target echoes used in experimental testing of the system of the present invention.

Referring now to FIGS. 5-7, the sea-test data came from an experiment performed by Acoustic Research Laboratory/Pennsylvania State University personnel in Dabob bay. It consisted of nine channels representing summed outputs from the rows of elements of a transducer. Thus, the dimension of freedom was the vertical. Synthetic target echoes were introduced into the signal by computing the root mean square (RMS) levels of the target and the environment within the time window of the target return. A signal-to-noise (S/N) ratio could then be selected and the target and environment added in the appropriate proportion. The scenario used for generation of the target echo was matched to that of the sea test. The source was 30 meters deep and moving at 15 knots. The bottom was approximately 200 meters. The target was chosen to be stationary and placed at 100 meters in horizontal range and at 30, 90, and 130 meters in depth. All signals were base-banded. FIG. 5 shows beamforming results, in terms of sensitivity versus angle, with target depth equal to 130 meters. Up and down are reversed on these plots. That is, the +45-degree target is directed toward the bottom.

By feeding the data into the beamformer in sections, the effect of each segment of the ping cycle series upon the PEs 40 could be seen. As it turned out, there were two unexpected object returns within the record. One was an anomalous return from some unknown object in the water. The other was caused by an error in the target echo which caused there to be two targets instead of one. The other target was giving a very brief return from an apparent angle of 26 degrees while the main return was at 45 degrees. Two of the beams responded to the 26-degree target, which can be seen in FIG. 5.

FIG. 6 shows the original time series signal on channel 5 and the processed signals derived by passing them through the trained beams. The time series signal looks as if it is all of uniform amplitude, whereas on the beam outputs one can discern the accentuation of where the target is and the squelching down of the rest of the signal relative thereto.

Actually, the beams are constantly changing so this is not exactly the true-beam response. But it shows how particular parts of the record are being emphasized by the beams. The arrow on the top trace is at the end of the 26-degree target (tar26) and the beginning of the 45 degree target (tar45).

FIG. 7 shows the phase nature of the artificial target echoes and the channel to channel phase difference produced by target reflection alone.

The present invention and many of its attendant advantages will be understood from the foregoing description and it will be apparent that various changes may be made in the form, construction and arrangement of the parts thereof without departing from the spirit and scope of the invention or sacrificing all of its material advantages, the forms hereinbefore described being merely exemplary embodiments thereof.

```
ccccccccccccccccccccccccccccccccccccccccccccccccccccccccccccccccc
c                        T R A I N
ccccccccccccccccccccccccccccccccccccccccccccccccccccccccccccccccc
c
c PURPOSE: To read in data and train the network.
c
c ------------------------- LOCAL VAR DECS -----------------------
c
$include: 'netprm.i'
        real wght(mxdim,mxunit)
        real vector(mxdim)
        real eector(mxdim)
        real input(mxsamp)
        real output(mxsamp,mxunit)
        real xray(mxsamp)
        integer dunit
        character*20 dname
        character*1 answer
        character*3 stat
        integer bunit
        integer ounit
        character*20 bname
        character*20 oname
        logical there
        logical pflag
        integer seed
        integer ia(55)
```

Appendix

```fortran
      real er(mxsamp)
      integer itdex(mxdim)
      real bold(mxdim,mxunit)
      real aold(mxdim,mxunit)
      real anew(mxdim,mxunit)
      real bnew(mxdim,mxunit)
      integer pfset
c
c ------------------------- COMMON BLOCKS -------------------------
c
      common /netcom/ vector,wght,input,output,xray
c
c
c ------------------------- DATA STATEMENTS -------------------------
c
      data iunit / 10 /, dunit / 11 /, bunit / 12 /, ounit / 13 /
      data seed /31415926/
      data pi / 3.1415926 /
c
c ------------------------- EXECUTABLE CODE -------------------------
c
c
      oname = 'wedge.out'
c     scale =  2**30 + (2**30 - 1)

c Open the control file.
      open( unit = iunit, file = 'wedge.ctl', status = 'old' )
c
c Read the number of sensors, the number of units, and the learning
rate.
      read(iunit,*) nsens
      read(iunit,*) nunits
      read(iunit,*) alpha
      read(iunit,*) pfset
      pflag = .false.
      if ( pfset .eq. 1 ) pflag = .true.
c
c Read the data file name.
      print *, ' Enter the data file name:'
      read(5,'(a)') dname
c
c Close the control file and open the data file.
      close( unit = iunit, status = 'keep' )
      open ( unit = dunit, file = dname, form = 'unformatted',
     &       status = 'old' )
c
c Read the number of data sets in the data file and number of items
per set.
      read(dunit) isamp,deltat,ndata,nsetsd,necho
c Read the channel dependent offsets.
      nchan = ndata/2
      read(dunit) (itdex(i),i=1,nchan)
c Read the "desired" signal
      read ( dunit ) ( er(i),i=1,necho )
c
c Read the number of sets to use for training.
      print *, ' Data file contains ',nsetsd,' data sets.'
      print *, ' '
      print *, ' Enter the number of data sets to skip,'
      print *, ' and the number to use for training:'
      read *, nskip,nsets
      if ( nsetsd .lt. nsets ) then
```

```fortran
            print *, ' The number of data sets available is',nsetsd
            print *, ' Will use available sets.'
            nsets = nsetsd
         endif
         do 60 iskip = 1,nskip
            read(dunit) (vector(i),i = 1,ndata),x,y,z
            read(dunit) (vector(i),i = 1,ndata),x,y,z
 60      continue
         print *, ' '
         print *, ' Select one:'
         print *, ' 1) Reverberation only.'
         print *, ' 2) Echo only.'
         print *, ' 3) Combined data.'
         read *, itype
         if ( itype .eq. 3 ) then
            print *, ' Enter desired signal to noise ratio:'
            read *, snr
         else
            snr = 0.0
         endif
         snrfac = 10.**(snr/20.)
         scale = sqrt(float(ndata/2))
c
c Initialize weights.
c
         print *, ' Start from scratch?'
         read(5,'(a)') answer
         oname = 'wedge.out'
         angle = 0.
         if ( answer .eq. 'y' ) then
         call rwseed('read',ia)
         do 100 j = 1,nunits
         do 100 i = 1,ndata-1,2
            call randit(ia,random)
c           angle = 2.*pi*(random)
            wght(i,j) = cos(angle)/scale
            wght(i+1,j) = sin(angle)/scale
            aold(i,j) = wght(i,j)
            bold(i+1,j) = wght(i,j)
            aold(i+1,j) = wght(i+1,j)
            bold(i,j) = wght(i+1,j)
 100     continue
         else
         open( unit = ounit, file = oname,
     &            form = 'unformatted', status = 'old' )
         read(ounit) ndatap
         do 200 j = 1, nunits
            read(ounit) (wght(i,j),i = 1,ndatap)
 200        continue
            close( unit = ounit, status = 'keep' )
         endif
         if ( answer .ne. 'y' .and. ndata .ne. ndatap ) then
         print *, ' Error: vector sizes do not match.'
         print *, ' wedge.out vector size is ',ndatap
         print *, ' data vector size is ',ndata
         stop
         endif
c
c Read and present the data to the network.
c
         do 1000 iset = 1,nsets
            call vecred(dunit,ndata,itype,snrfac,scale,x,y,z)
```

```fortran
      call twedge( nunits,aold, bold, vector,
     &             ndata, alpha, anew, bnew, imax, pflag )
          wnorm = 0.
          bnorm = 0.
          do 1005 i = 1,ndata
             wnorm = wnorm + anew(i,imax)**2
             bnorm = bnorm + bnew(i,imax)**2
1005      continue
          wnorm = sqrt(wnorm)
          bnorm = sqrt(bnorm)
          if ( pflag ) then
             print *, ' wnorm =',wnorm
             print *, ' bnorm =',bnorm
          endif
          do 1010 i = 1,ndata
             if ( wnorm .ne. 0. ) then
                wght(i,imax) = anew(i,imax)/wnorm
                bnew(i,imax) = bnew(i,imax)/bnorm
             else
                wght(i,imax) = anew(i,imax)
             endif
             aold(i,imax) = wght(i,imax)
             bold(i,imax) = bnew(i,imax)
1010      continue
1000  continue
c
c Convert to beam weights and output beams and
c write the weights out to file wedge.out .
c
      inquire( file = oname, exist = there )
      if ( there ) then
         stat = 'old'
      else
         stat = 'new'
      endif
      open( unit = ounit, file = oname,
     &      form = 'unformatted', status = stat )
      write(ounit) ndata
      dmin = 1.e9
      dmax = -1.e9
      dmini = 1.e9
      dmaxi = -1.e9
      do 1200 ibeam = 1,nunits
      write(ounit) (wght(i,ibeam), i = 1,ndata)
         write(bname,1015) ibeam
1015     format( 'phsbem',i2.2 )
      inquire( file = bname, exist = there )
      if ( there ) then
         stat = 'old'
         else
         stat = 'new'
         endif
      open( unit = bunit, file = bname, status = stat )
      write(bunit,*) ' *** type: beam'
      write(bunit,*) bname
      write(bunit,*) ' 1'
      write(bunit,*) ' eyes9'
      write(bunit,*) ' 0. 0. 0.'
      write(bunit,*) ' 0.'
      write(bunit,*) ' 0.'
      write(bunit,*) ' 2'
      neles = ndata/2
```

```fortran
            write(bunit,*) neles
            k = 0
            do 1100 i = 1,ndata-1,2
               k = k + 1
               write(bunit,*) k,wght(i,ibeam),-wght(i+1,ibeam)
1100        continue
            close( unit = bunit, status = 'keep' )
c
c Set up data file for re-read.
            rewind dunit
            read(dunit) isamp,deltat,ndata,nsetsd,necho
            nchan = ndata/2
            read(dunit) (itdex(i),i=1,nchan)
            read ( dunit ) ( er(i),i=1,necho )
            do 1140 iskip = 1,nskip
               read(dunit) (vector(i),i = 1,ndata),x,y,z
               read(dunit) (vector(i),i = 1,ndata),x,y,z
1140        continue
c Generate beam outputs and plot them.
            iref = ndata/2 - 1
            do 1170 iset = 1,nsets
               call vecred( dunit,
     &                      ndata,itype,snrfac,scale,
     &                      x,y,z )
               sum = 0.
               do 1150 i = 1,ndata-1,2
                  sum = sum + wght(i,ibeam)**2 + wght(i+1,ibeam)**2
1150           continue
               out = 0.0
               do 1160 i = 1,ndata-1,2
                  out = out + wght(i,ibeam)*vector(i)
     &                      + wght(i+1,ibeam)*vector(i+1)
1160           continue
               if ( sum .ne. 0. ) then
                  out = out/sqrt(sum)
               else
                  out = out
               endif
               output(iset,ibeam) = out
               input(iset) = vector(iref)
               if ( out .gt. dmax ) dmax = out
               if ( input(iset) .gt. dmaxi ) dmaxi = input(iset)
               if ( out .lt. dmin ) dmin = out
               if ( input(iset) .lt. dmini ) dmini = input(iset)
1170        continue
1200     continue
         close ( unit = ounit, status = 'keep' )
         close ( unit = dunit, status = 'keep' )
c
         call chplot( dname,nskip,nsets,
     &                isamp,itdex(iref),deltat,
     &                nsets,dmin,dmax,dmini,dmaxi,
     &                nunits )
         call bemplt
c
         stop
         end
```

```
      subroutine iwedge( aold, bold, N )
c
c PURPOSE: To initialize the basis vectors for the bi-vector.
c
c ------------------------ ARGUMENT DECS --------------------------
c
      real aold(N)
      real bold(N)
      integer N
c
c ------------------------ EXECUTABLE CODE ------------------------
c
      do 100 i = 1,N-1,2
         aold(i) = 1.
         aold(i+1) = 0.
         bold(i) = 0.
         bold(i+1) = 1.
100   continue
c
      return
      end
      subroutine twedge( nunit,aold, bold, x,
     &                   N, alpha, anew, bnew, imax, pflag )
c
c PURPOSE: To train on the input x using the wedge product rule.
c
c ------------------------ ARGUMENT DECS --------------------------
c
$include: 'netprm.i'
      real aold(mxdim,mxunit)
      real bold(mxdim,mxunit)
      real x(mxdim)
      integer N
      real alpha
      real anew(mxdim,mxunit)
      real bnew(mxdim,mxunit)
      logical pflag
c
c ------------------------ LOCAL VAR DECS -------------------------
c
      real c(mxdim)
      real d(mxdim)
      real xdota(mxunit),xdotb(mxunit)
c
c ------------------------ EXECUTABLE CODE ------------------------
c
      if ( N .gt. mxdim ) then
         print *, ' Exceeding array dimension(twedge.f).'
         stop
      endif
c
      imax = 1
      dmax = 0.
      do 180 iunit = 1,nunit
         xdota(iunit) = 0.
         xdotb(iunit) = 0.
         do 100 i = 1,N
            xdota(iunit) = xdota(iunit) + x(i)*aold(i,iunit)
            xdotb(iunit) = xdotb(iunit) + x(i)*bold(i,iunit)
100      continue
```

```
c
          capc = 0.
          do 150 i = 1,N
              c(i) = xdota(iunit)*aold(i,iunit)
     &               + xdotb(iunit)*bold(i,iunit)
              capc = capc + c(i)**2
150       continue
          if ( capc .gt. cmax ) then
              cmax = capc
              imax = iunit
          endif
180    continue
       if ( pflag ) then
           print *, ' '
           print *, ' '
           print *, ' imax,cmax =',imax,cmax
       endif
c
       cnorm = 0.
       do 200 i = 1,N
           c(i) = xdota(imax)*aold(i,imax)
     &            + xdotb(imax)*bold(i,imax)
           cnorm = cnorm + c(i)**2
           bnew(i,imax) = xdota(imax)*bold(i,imax)
     &                    - xdotb(imax)*aold(i,imax)
200    continue
       oma = 1. - alpha
       cnorm = sqrt( cnorm )
       print *, ' cnorm =',cnorm
       do 300 i = 1,N
           if ( cnorm .ne. 0. ) c(i) = c(i)/cnorm
           anew(i,imax) = alpha*x(i) + oma*c(i)
300    continue
c
       if ( pflag ) then
           print *, ' x ='
           print *, (x(i),i=1,N)
           print *, ' '
           print *, ' c ='
           print *, (c(i),i=1,N)
           print *, ' '
           print *, ' imax =',imax,' anew ='
           print *, (anew(i,imax),i = 1,N )
           print *, ' '
           print *, ' bnew = d ='
           print *, (bnew(i,imax),i = 1,N )
       endif
c
       return
       end
       subroutine vdotbi( v, bi, N, z )
c
c Purpose: To form the dot product of a vector(1-blade) with
c          a bi-vector.
c
c NOTE:  In its present form, this routine is valid for 3D only.
c
c S. L. Speidel, 7 Sep 87
c
c ----------------------- ARGUMENT DECS -----------------------
c
       real v(N)
       real bi(N)
```

```fortran
      integer N
      real z(N)
c
c ---------------------- LOCAL VAR DECS ---------------------------
c
c
c ---------------------- EXECUTABLE CODE --------------------------
c
      if ( N .lt. 2 ) then
         print *, ' Error ( vdotbi.f )'
         print *, ' Inputs are scalars. N =',N
         stop
      endif
      if ( N .gt. 2 ) then
         j = 1
         k = 2
         do 100 i = 1,N-2
            j = j + 1
            k = k + 1
            z(i) = v(k)*bi(j) - v(j)*bi(k)
100      continue
      endif
c
      z(N-1) = v(1)*bi(N) - v(N)*bi(1)
      z(N)   = v(2)*bi(1) - v(1)*bi(2)
c
      return
      end
      subroutine vwedgv( v1, v2, N, z )
c
c PURPOSE: To take the wedge product of two vectors(1-blades).
c
c S. L. Speidel, 7 Sep 87
c ----------------------- ARGUMENT DECS ---------------------------
c
      real v1(N)
      real v2(N)
      integer N
      real z(N)
c
c ----------------------- EXECUTABLE CODE -------------------------
c
      k = 0
      l = 1
      do 100 i = 3,N
         k = k + 1
         l = l + 1
         z(i) = v1(k)*v2(l) - v1(l)*v2(k)
100   continue
c
      z(1) = v1(N-1)*v2(N) - v1(N)*v2(N-1)
      z(2) = v1(N)*v2(1)   - v1(1)*v2(N)
c
      return
      end
c PURPOSE: To test the bi-vector multiplication routines.
c
      parameter ( maxvec = 6, maxang = maxvec/2 )
      real z1(maxvec)
      real z2(maxvec)
      real bold(maxvec)
      real bnew(maxvec)
      real a(maxvec)
      real tmp(maxvec)
```

```
      real d(maxvec)
      real c(maxvec)
      real angl(maxang)
      real dif(maxang)
c
c ------------------------- DATA STATEMENTS ---------------------
c
      data pi / 3.1415926 /, cdr / 1.7453293e-2 /, crd / 57.295780 /
      data alpha / 0.5 /
c
c ------------------------- EXECUTABLE CODE ---------------------
c
      print *, ' Number of iterations?'
      read *, niter
c
c Initialize the basis vectors.
      do 100 i = 1,maxvec,2
         z1(i) = 1.
         z1(i+1) = 0.
         z2(i) = 0.
         z2(i+1) = 1.
100   continue
      znorm = sqrt(14.)
c     z1(1) = 2./znorm
c     z1(2) = 3./znorm
c     z1(3) = 1./znorm
c     z2(1) = 1./3.
c     z2(2) = 2./3.
c     z2(3) = 2./3.
      print *, ' z1 ='
      print *, z1
      print *, ' z2 ='
      print *, z2
      print *, ' '
c
c Initialize the bi-vector.
      call vwedgv( z1, z2, maxvec, bold )
      bnorm = 0.
      do 150 i = 1,maxvec
         bnorm = bnorm + bold(i)**2
150   continue
c
c Define input vector.
      delta = pi*sin(45.*cdr)
      angle = -delta
      anorm = sqrt(float(maxvec/2))
      do 200 i = 1,maxvec,2
         angle = angle + delta
         a(i) = cos(angle)/anorm
         a(i+1) = sin(angle)/anorm
200   continue
c     a(1) = 2./sqrt(14.)
c     a(2) = 1./sqrt(14.)
c     a(3) = 3./sqrt(14.)
c
c Train the bivector.
      do 1000 iter = 1,niter
         print *, ' bold ='
         print *, bold
         call vdotbi( a, bold, maxvec, d )
         call vdotbi( d, bold, maxvec, c )
         dnorm = 0.
```

```
              cnorm = 0.
              do 280 i = 1,maxvec
                  dnorm = dnorm + d(i)**2
                  cnorm = cnorm + c(i)**2
280           continue
              dnorm = sqrt(dnorm)
              cnorm = sqrt(cnorm)
              print *, ' dnorm =',dnorm
              print *, ' cnorm =',cnorm
              do 300 i = 1,maxvec
                  c(i) = -c(i)/cnorm
                  d(i) = d(i)/dnorm
                  tmp(i) = alpha*a(i) + (1 - alpha)*c(i)
300           continue
              print *, ' a ='
              print *, a
              print *, ' d ='
              print *, d
              print *, ' c ='
              print *, c
              call vwedgv( tmp, d, maxvec, bnew )
              print *, ' bnew ='
              print *, bnew
              k = 0
              do 500 i = 1,maxvec,2
                  k = k + 1
                  angl(k) = crd*atan2( bnew(i+1), bnew(i) )
500           continue
              print *, angl
              do 550 i = 1,maxang-1
                  dif(i) = angl(i+1) - angl(i)
550           continue
              print *, (dif(i), i= 1,maxang-1)
c
              do 600 i = 1,maxvec
                  bold(i) = bnew(i)
600           continue
c
1000      continue stop
          end
          subroutine vecred( dunit,
     &                       ndata,itype,snrfac,scale,
     &                       x,y,z )
c
c PURPOSE: To read a vector from a data file assigned to dunit.
c
c ----------------------- ARGUMENT DECS -----------------------
c
          integer dunit
          integer itype
          real scale
          real x,y,z
c
c ----------------------- LOCAL VAR DECS -----------------------
c
$include: 'netprm.i'
          real wght(mxdim,mxunit)
          real vector(mxdim)
          real eector(mxdim)
          real input(mxsamp)
```

```
      real output(mxsamp,mxunit)
      real xray(mxsamp)
c
c ----------------------- COMMON BLOCKS ---------------------------
c
      common /netcom/ vector,wght,input,output,xray
c
c ----------------------- EXECUTABLE CODE -------------------------
c
      if ( itype .eq. 1 ) then
c Reverberation only.
         read(dunit) (vector(i),i = 1,ndata),x,y,z
         read(dunit) (eector(i),i = 1,ndata),x,y,z
      elseif ( itype .eq. 2 ) then
c Echo only.
         read(dunit) (eector(i),i = 1,ndata),x,y,z
         read(dunit) (vector(i),i = 1,ndata),x,y,z
      else
c Combined data.
         read(dunit) (vector(i),i = 1,ndata),x,y,z
         read(dunit) (eector(i),i = 1,ndata),x,y,z
         do 300 i = 1,ndata
            vector(i) = (vector(i) + eector(i)*snrfac)
300      continue
      endif
      do 400 i = 1,ndata-1,2
         elnorm = sqrt( vector(i)**2 + vector(i+1)**2 )
         if ( elnorm .ne. 0. ) then
            vector(i) = vector(i)/elnorm/scale
            vector(i+1) = vector(i+1)/elnorm/scale
         endif
400   continue
c
      return
      end
      subroutine chplot( name,nskip,nsets,
     &                   isamp,index,deltat,
     &                   npts,datmin,datmax,dmini,dmaxi,
     &                   nchan )
c
c PURPOSE:  To plot multi-channel outputs.
c
c ----------------------- ARGUMENT DECS ---------------------------
c
      character*20 name
      integer nskip,nsets
      integer isamp,index
      real deltat
      integer npts
      real datmin,datmax
      real dmini,dmaxi
      integer nchan
c
c ----------------------- LOCAL VAR DECS --------------------------
c
$include: 'netprm.i'
      real wght(mxdim,mxunit)
      real vector(mxdim)
      real eector(mxdim)
      real input(mxsamp)
      real output(mxsamp,mxunit)
      real xray(mxsamp)
```

```fortran
      character*50 xlabel,ylabel,clabel
      integer punit
      character*13 pname
      character*1 type
      real yray(mxsamp)
c
c ------------------------- COMMON BLOCKS -------------------------
c
      common /netcom/ vector,wght,input,output,xray
c
c ------------------------- EXECUTABLE CODE -------------------------
c
      print *, ' Enter chplot.'
      pname = 'chplot.plt'
      call asgfil( pname,punit )
      call plttyp( type )
      xin = 2.0
      tstart = (isamp+nskip-1)*deltat
      xmin = tstart
      xmax = tstart + (npts - 1)*deltat
      xstp = int(xmax - xmin)/4
      if ( xstp .eq. 0 ) then
         xstp = xmax - xmin
      endif
      x = tstart - deltat
      do 100 i = 1,npts
         x = x + deltat
         xray(i) = x
100   continue
      ymin = dmini
      ymax = dmaxi
      xaxis = 5.
      gap = 0.3
      yaxis = 6./(nchan+2) - gap
      yin = 6.5 - yaxis - gap/2.
      nincx = 2
      ndecx = 3
      xscale = 1.
      xshift = 0.
      xlabel = ' time(sec)'
      ystp = ymax - ymin
      nincy = 2
      ndecy = 1
      iscale = -alog10(datmax)
      yscale = 10.**(iscale)
      yshift = 0.
      if ( iscale .eq. 0 ) then
         write ( ylabel,113) name(1:lstnbc(name)),nskip,nsets
113      format( a,':',i3,',',i3 )
      else
         write( ylabel,115 ) name(1:lstnbc(name)),nskip,nsets,iscale
115      format( a,':',i3,',',i3,'( x10**',i3.2,' )' )
      endif
      clabel = ' '
      call recplt( punit,
     &             xin,yin,
     &             xmin,xstp,xmax,nincx,
     &             ndecx,xscale,xshift,xaxis,
     &             xlabel,
     &             ymin,ystp,ymax,nincy,
     &             ndecy,yscale,yshift,yaxis,
     &             ylabel,
```

```
      &              xray,input,npts,clabel )
       yin = yin - 0.5
       do 405 i = 1,npts
          yray(i) = ymin
405    continue
       xval = xray( index-(isamp+nskip)+1 )
       angle = 180.
       alenth = .25
       call pointr( punit,
      &              xval,angle,alenth,
      &              xray,yray,npts,
      &              ' ' )
c
       ndecx = -1
       yin = yin - 0.5
       dyin = yaxis + gap
       ymin = datmin
       ymax = datmax
       ystp = ymax - ymin
       do 500 ichan = 1,nchan
          write (ylabel,415) ichan
415       format( 'beam',i2.2 )
          yin = yin - dyin
          call recplt( punit,
      &              xin,yin,
      &              xmin,xstp,xmax,nincx,
      &              ndecx,xscale,xshift,xaxis,
      &              xlabel,
      &              ymin,ystp,ymax,nincy,
      &              ndecy,yscale,yshift,yaxis,
      &              ylabel,
      &              xray,output(1,ichan),npts,clabel )
500    continue
c
       close ( unit = punit, status = 'keep' )
       call pltgen( type, pname )
       return
       end ccccccccccccccccccccccccccccccccccccccccccccccccccccccccccccccc
c
c                    t b l s p c
c
ccccccccccccccccccccccccccccccccccccccccccccccccccccccccccccccc
c
       subroutine tblspc(st1  ,fname,
     2                    st2  ,bname,
     3                    st3  ,kind,
     4                    st4  ,trname,
     5                    st5  ,Po,
     6                    st6  ,wvleng,
     8                    st7  ,elemin,
     9                    st8  ,elemax,
     &                    st9  ,elestp,
     1                    st10 ,bermin,
     2                    st11 ,bermax,
     3                    st12 ,berstp,
     4                    st13 ,mxeles,
     5                    st14 ,mxbers,
     6                    st15 ,angle1,
     7                    st16 ,angle2,
     8                    st17 ,tblval )
```

```
c
c USAGE:            An example of the method of invocation
c
c         call tblspc('make'                       ,'Tomni'
c     2                'beam file name'            ,bname,
c     3                'file type'                 ,kind,
c     4                'transducer name'           ,trname,
c.    5                'beam phase center position',Po,
c     6                'nominal electronic steering',steer,
c     7                'propagation wavelength'    ,wvleng,
c     8                'elevation minimum(dg)'     ,elemin,
c     9                'elevation maximum(dg)'     ,elemax,
c     &                'elevation resolution(dg)'  ,elestp,
c     1                'bearing minimum(dg)'       ,bermin,
c     2                'bearing maximum(dg)'       ,bermax,
c     3                'bearing resolution(dg)'    ,berstp,
c     4                'max number of elevations'  ,mxeles,
c     5                'max number of bearings'    ,mxbers,
c     6                'elevation values(dg)'      ,angle1,
c     7                'bearing values(dg)'        ,angle2,
c     8                'table values '             ,tblval )
c
c PURPOSE:
c               To solicit, read, and write beam table parameters and
c               beam weight values.
c
c LIMITATIONS: If the action indicator (st1) is 'make' then it is
assumed
c             that an element weight file exists which has the name
c             bname.
c
c WARNINGS:     N/A
c
c EXTERNALS:    bemspc : called to read parameters
c               dcrspc : called to read transducer layout
c               bempat : called to calculate beam table values
c
c ARGMENTS:
c
c         (See USAGE)
c
c NOTES:        General comments which are applicable to either the
pro-
c             gram or subprogram invoking the subprogram, limita-
tion
c             on equipments for which the subprogram will operate,
c             special formulation requirements against specific
argu-
c             ments (using the dummy argument names, given in the
c             usage example), etc.
c
c PROGRAMMER:   Speidel, NOSC
c
c DATE:         25 Jan 84
c
c ALGORITHM:    N/A
c
c UPDATE:
c***          xx mth xx;    name;    #) description of the update
c***          xx mth xx;    name;    #) description of the update
c
c ------------------ ARGUMENT DECLARATIONS
-------------------
```

```
c
      parameter ( mxelms = 100   )
c
      character*(*) fname,
     1              bname,
     1              trname
c
      character*(*) st1,st2,st3,st4,st5,st6,st7,st8,st9,
     1              st10,st11,st12,st13,st14,st15,st16,
     1              st17
c
      logical prite,there,chktyp
c
      complex tblval(mxbers,mxeles)
c
      dimension Po(3)
      dimension angle1(1),angle2(1)
c
c ----------------- COMMON BLOCKS
c ----------------------------------
      logical debug
      common / debug / debug
      logical out
      common / out / out
c
c ----------------- LOCAL VARIABLE DECLARATIONS
c ----------------
c
      integer getunt
      integer nunit
      integer ounit
      character*12 elname,name,names(50)
      character *1 answer,yesno
c
      character*12 stang(2)
c
      integer wtype,ftype
c
      complex bpat
c
      dimension fore(mxelms),star(mxelms),down(mxelms),
     &          head(mxelms),pitch(mxelms)
c
      dimension hatK(3),hatKst(3)
      dimension param(2)
      dimension wt1(mxelms),wt2(mxelms)
      character*12 prtdum
      character*12 retoch
      character*12 intoch
      logical opend
      logical new
c
c ------------------------- DATA STATEMENTS
c -------------------------
c
      data cdr / 1.7543292e-2 /
c
c ------------------------- EXECUTABLE CODE
c -------------------------
c
      nunit = getunt(10)
      if (st1 .eq. 'input       ' .or.
     &        st1 .eq. 'make' .or. st1 .eq. 'makeit' ) then
```

```
          prite = .true.
          iunit = 5
      else
          prite = .false.
          iunit = nunit
          inquire (file = fname, exist = there)
          if ( .not. there ) then
              print *, ' File ',fname,' does not exist (tblspc.f)'
              stop
          else
              open (unit = iunit, file = fname, status = 'old')
              rewind iunit
          endif
      endif
c
c  Read the beam name
c
      if ( st1 .eq. 'input' .or. st1 .eq. 'make' ) then
          inquire (file = 'tbemmenu', exist = there )
          if (.not. there ) then
              print *, ' ***** M I S S I N G  F I L E *****'
              print *, ' Routine tblspc.f trying to read file tbemmenu'
              stop
          endif
c
c  Print out the beam menu for the user to choose a transmit beam
c
          print *, ' '
          print *, ' '
          print *, ' '
          print *, ' '
          print *, ' '
          print *, ' '
          print *, ' '
          print *, ' '
          print *, ' '
          print *, ' '
          print *, ' The following beam files already exist within your'
          print *, ' beam menu. Either use a new file name or enter one',
     &            ' of'
          print *, ' the listed names if you wish to overwrite the',
     &            ' existing'
          print *, ' file.'
          print *, ' '
          call rdmenu( 'tbemmenu','menu',' ',N,names )
          print *, ' '
          print *, ' Please enter the table file name:'
      else
          if ( st1 .ne. 'makeit' ) then
              if ( .not. chktyp ( iunit, fname, 'tbeam' ) ) call kill
          endif
      endif
c
      if ( st1 .ne. 'makeit' ) call rdname(iunit,fname)
c
      if ( prite ) then
          if ( fname .eq. 'help' ) then
10            continue
              print *, ' Which beam would you like to know more about?'
              print *, ' (enter beam name):'
```

```
              call rdname(iunit,fname)
              call rdmenu( 'tbemmenu','help',fname,N,names )
              print *, ' '
              print *, ' Hit return to continue :'
              read (iunit,22) answer
22            format (a)
c
c     Print out the beam menu for the user to choose a transmit beam
c
              print *, ' '
              print *, ' '
              print *, ' '
              print *, ' '
              print *, ' '
              print *, ' '
              print *, ' '
              print *, ' '
              print *, ' '
              print *, ' '
              print *, ' The following beam files already exist within
     your'
              print *, ' beam menu. Either use a new file name or enter
     one',
     &               ' of'
              print *, ' the listed names if you wish to overwrite the',
     &               ' existing'
              print *, ' file.'
              print *, ' '
              call rdmenu( 'tbemmenu','menu',' ',N,names )
              print *, ' '
              print *, ' Please enter the table file name:'
              call rdname(iunit,fname)
              if (fname .eq. 'help' ) go to 10
          endif
       endif
       if (debug) print *, '                       fname=',fname
c
c     Determine what kind of beam file this is (or is to be)
c
       if ( st1 .ne. 'input' .and.
     &      st1 .ne. 'make' .and. st1 .ne. 'makeit' ) then
          read (iunit,*) kind
       endif
c
c     Read in the transducer name and the phase center offset
c     unless the beam table is being generated from an element
c     weight file, in which case it is assumed that these are
c     passed as inputs to this routine after a call to bemspc.
c
       if ( st1 .ne. 'make' .and. st1 .ne. 'makeit' ) then
          trname = 'noname'
          if (prite) then
             print *, ' Please enter the transceiver name: [ noname ]'
          endif
          call rdname(iunit,trname)
          if (debug) print *, '                       trname=',trname
c
c     Determine the position of the phase center for the beam
c
          Po(1) = 0.
          Po(2) = 0.
          Po(3) = 0.
```

```
          if (prite) then
              print *, ' Please enter the beam phase center position,'
              print *, ' (forward,starboard,down in meters): [0. 0. 0.]'
          endif
          read (iunit,*) Po
          if (debug) print *, '
Po=',Po(1),Po(2),Po(3)
      endif
c
      if (kind .eq. 2) then
          stang(2) = 'bearing'
          stang(1) = 'elevation'
      else
          stang(2) = 'axial '
          stang(1) = 'roll '
      endif
c
c
c Read the wavelength at which the table was (is to be) generated
c
      wvleng = 0.075
      prtdum = retoch(wvleng)
c     if (prite) then
c         print *, ' Enter the wavelength for the table (m): [',
c    &              prtdum(1:lstnbc(prtdum)),']'
c     endif
c     read (iunit,*) wvleng
      if (debug) print *, '                           wvleng=',wvleng
c
c Determine the table limits and resolutions
c
c
      elemin = -90.
      elemax = 90.
      elestp = 4.
      if (prite) then
c         print *, ' Please enter the minimum and maximum ',stang(1)
c         print *, ' extent for the table and the angular resolution:'
c         print *, ' [',elemin,elemax,elestp,']'
      endif
c     read (iunit,*) elemin,elemax,elestp
      if ( elestp .eq. 0. ) then
          nelevs = 1
      else
          nelevs = (elemax - elemin )/elestp + 1.0
          elemax = elemin + float(nelevs - 1)*elestp
      endif
      if (debug) then
              print *, stang(1),' min,max,stp='
              print *,'                              ',elemin
              print *,'                              ',elemax
              print *,'                              ',elestp
      endif
c
      if (st1 .eq. 'input' .or. st1 .eq. 'make' .or.
     &    st1 .eq. 'makeit' ) then
          bermin = 0.
          bermax = 0.
          berstp = 0.
c         print *, ' Please enter the minimum and maximum ',stang(2)
c         print *, ' extent for the table and the angular resolution:'
c         print *, ' [',bermin,bermax,berstp,']'
      endif
```

```
c         read (iunit,*) bermin,bermax,berstp
c
          if ( berstp .eq. 0. ) then
             nbears = 1
          else
             nbears = (bermax - bermin )/berstp + 1.0
             bermax = bermin + float(nbears - 1)*berstp
          endif
          if (debug) then
                      print *, stang(2),' min,max,stp='
                      print *,'                                        ',bermin
                      print *,'                                        ',bermax
                      print *,'                                        ',berstp
          endif
          if (debug) then
              print *, ' Number of',stang(1),'angles =' ,nelevs
              print *, ' Number of',stang(2),'angles =' ,nbears
          endif
c
          if ( nelevs .gt. mxeles) then
              print *, ' Exceeding maximum array size, mxeles =',mxeles
              print *, ' Requiring too many',stang(1),'angles (tblspc.f)'
              stop
          endif
c
          if ( nbears .gt. mxbers ) then
              print *, ' Exceeding maximum array size, mxbers =',mxbers
              print *, ' Requiring too many',stang(2),'angles (tblspc.f)'
              stop
          endif
c
          bear = bermin - berstp
          do 80 j = 1,nbears
              bear = bear + berstp
              angle2(j) = bear
              if ( j .eq. nbears ) angle2(j) = bermax
80        continue
          if ( st1 .eq. 'make' .or. st1 .eq. 'makeit' ) then
          call bemspc('file'                              ,bname,
     2                'beam name='                        ,name,
     3                '(1)element weights or (2) table =' ,kindb,
     4                'transceiver name ='                ,trname,
     5                'phase center position'             ,Po,
     6                'electronic steering angle(dg)'     ,steer1,
     7                '    ..       ..       ..    '      ,steer2,
     9                'element type name'                 ,elname,
     &                'element parameters'                ,param,
     1                'element weight type='              ,wtype,
     2                'number of elements='               ,nbelms,
     3                'position arrays='                  ,fo-
     re,star,down,
     4                'element heading and pitch'         ,head,pitch,
     5                'element weight parts ='            ,wt1,wt2 )
c
          if (debug) print *, '                       ****** nbelms=',nbelms
c
c
          call direct('first steering angle'   ,steer1,
     &                'second steering angle'  ,steer2,
     &                'dummy'                  ,dummy,
     &                'kind of calculation'    ,kind,
     &                'steering vector'        ,hatKst )
```

```
c
      if (debug) then
         print *, ' kind=',kind,' from direct: hatKst(1)=',hatKst(1)
         print *, '                                  (2)=',hatKst(2)
         print *, '                                  (3)=',hatKst(3)
      endif
c
c
      ele = elemin - elestp
      if (debug) then
         print *, ' Encountering elevation-bearing loop.'
         print *, ' ele =',ele,' elemin =',elemin,' elestp =',elestp
      endif
c
      do 100 i = 1,nelevs
         ele = ele + elestp
         angle1(i) = ele
         if (i .eq. nelevs ) angle1(i) = elemax
      do 100 j = 1,nbears
c
         call direct('first look angle'          ,angle1(i),
     &               'second look angle'         ,angle2(j),
     &               'dummy'                     ,dummy,
     &               'kind of calculation'       ,kind,
     &               'look direction vector'     ,hatK )
c
c        print *, 'tblspc:angle1,angle2,hatK=',angle1(i),angle2(j),
c     &                                        hatK
         call bempat('look direction vector='    ,hatK,
     2               'beam phase center'         ,Po,
     3               'steering direction vector' ,hatKst,
     4               'wavelength'                ,wvleng,
     5               'element directivity type'  ,elname,
     6               'directivity parameters'    ,param,
     7               'element weight type'       ,wtype,
     8               'number of elements='       ,nbelms,
     9               'element positions'         ,fore,star,down,
     &               'element orientation'       ,head,pitch,
     1               'element weight'            ,wt1,wt2,
     2               'beam factor'               ,bpat )
c
         tblval(j,i) = bpat
c
100   continue
c
      if (debug) then
         do 120 i = 1,nelevs
         do 120 j = 1,nbears
            print *, ' ',j,i,angle2(j),angle1(i),tblval(j,i)
120      continue
      endif
c
      else
c
         if (prite) then
            ftype = 1
            prtdum = intoch( ftype )
            print *, ' Do you wish to enter the beam factors '
            print *, ' in the form of: [',prtdum(1:lstnbc(prtdum)),']'
            print *, '                 (1) amp-phase?'
            print *, '                 (2) real-imaginary?'
            read *, ftype
```

```
c
              print *, ' Please enter beam factors for each table
     entry.'
              print *, ' If you make a mistake, continue on and edit the
     '
              print *, ' file after completion of this process.'
           endif
c
           ele = elemin - elestp
           do 400 i = 1,nelevs
              ele = ele + elestp
              angle1(i) = ele
              do 300 j = 1,nbears
                 if (prite) then
                    print 310, j,i,stang(2),angle2(j),stang(1),angle1(i)
310                 format(1x,i3,',',i3,1x,a12,'=',f7.2,1x,a12,'=',f7.2 )
                    read (iunit,*) tbl1,tbl2
                 else
                    read (iunit,*) l,k,angle2(j),angle1(i),tbl1,tbl2
                 endif
                 if (ftype .eq. 1) then
                    phase = tbl2*cdr
                    tblval(j,i) = cmplx(tbl1*cos(phase),
     &                                  tbl1*sin(phase) )
                 else
                    tblval(j,i) = cmplx(tbl1,tbl2)
                 endif
300           continue
400        continue
c
        endif
c
c
        if ( st1 .eq. 'input' .or.
     &       st1 .eq. 'make' .or. st1 .eq. 'makeit' ) then
c          if ( st1 .eq. 'makeit' ) then
              call opntyp( ounit,fname,'write','tbeam',
     &                     opend,new )
c          else
c             call opnsel( fname,ounit,'tbemmenu','tbeam',
c    &                     'write',opend,new )
c          endif
c
c
        if (debug) then
           print *, '                         ***** tblout *****'
           print *, '                         fname = ',fname
        endif
c
        write (ounit,5) fname
5       format (1x,a,t30,'beam name')
        write (ounit,15) kind
15      format (1x,i2,t30,'beam file type')
        write (ounit,25) trname
25      format (1x,a,t30,'transducer name')
        write (ounit,35) Po
35      format (1x,3f7.3,t30,'beam phase center offset')
        write (ounit,42) wvleng
42      format (1x,f7.4,t30,'propagation wavelength(m)')
        write (ounit,45) elemin,elemax,elestp,stang(1)
45      format (1x,3f7.1,t30,a12,'minimum,maximum,step')
        write (ounit,55) bermin,bermax,berstp,stang(2)
```

```
55          format (1x,3f7.1,t30,a12,'minimum,maximum,step')
            do 600 i = 1,nelevs
            do 600 j = 1,nbears
               write (ounit,60) j,i,angle2(j),angle1(i),tblval(j,i)
60             format(1x,2i4,2f7.1,2x,g15.7,',',g15.7)
600         continue
            close ( unit = ounit, status = 'keep' )
c
         endif
c
         inquire( unit = nunit, opened = opend )
         if ( opend ) close ( unit=nunit, status='keep' )
         return
         end
c ---------------------- LOCAL VAR DECS ----------------------------
c
$include: 'netprm.i'
         real bold(mxdim,mxunit)
         real aold(mxdim,mxunit)
         real anew(mxdim,mxunit)
         real bnew(mxdim,mxunit)
         real x(mxdim)
c
c ---------------------- EXECUTABLE CODE ----------------------------
c
         print *, ' nunit, alpha, no.of iterations?'
         read *, nunit,alpha,niter
c
         print *, ' N = ?'
         read *, N
c
         do 50 iunit = 1,nunit
            print *, ' a = ?'
            read *, (aold(i,iunit),i = 1,N)
            print *, (aold(i,iunit),i = 1,N)
c
            print *, ' b = ?'
            read *, (bold(i,iunit),i = 1,N)
            print *, (bold(i,iunit),i = 1,N)
c
            anorm = 0.
            bnorm = 0.
            do 20 i = 1,N
               anorm = anorm + aold(i,iunit)**2
               bnorm = bnorm + bold(i,iunit)**2
20          continue
            print *, ' anorm = sqrt(',anorm
            print *, ' bnorm = sqrt(',bnorm
            anorm = sqrt(anorm)
            bnorm = sqrt(bnorm)
            do 30 i = 1,N
               aold(i,iunit) = aold(i,iunit)/anorm
               bold(i,iunit) = bold(i,iunit)/bnorm
               anew(i,iunit) = aold(i,iunit)
               bnew(i,iunit) = bold(i,iunit)
30          continue
50       continue
c
         xnorm = sqrt(14.)
         x(1) = 2./xnorm
         x(2) = 1./xnorm
         x(3) = 3./xnorm
```

```
c
      do 200 iter = 1,niter
         call twedge( nunit,aold, bold,
     &                x, N, alpha, anew, bnew, imax )
c
         dot = 0.
         do 100 i = 1,N
            dot = dot + anew(i,imax)*bnew(i,imax)
100      continue
         print *, ' a dot b =', dot
         anorm = 0.
         bnorm = 0.
         do 120 i = 1,N
            anorm = anorm + anew(i,imax)**2
            bnorm = bnorm + bnew(i,imax)**2
120      continue
         do 150 i = 1,N
            aold(i,imax) = anew(i,imax)/anorm
            bold(i,imax) = bnew(i,imax)/bnorm
150      continue
200   continue
c
      stop
      end
```

Having thus described the invention, what is claimed is:

1. A signal phase sensitive neural network system, comprising:
   (a) a plurality of means for sensing a signal emanating from an environment of interest;
   (b) a first layer means composed of a plurality of pairs of processing elements;
   (c) means interconnecting each said sensing means with a pair of said plurality of pairs of processing elements of said first layer for transmitting one input representative of said sensed signal to one processing element of each said pair of processing elements and another input representative of a phase shifted said sensed signal; and
   (d) a second layer means composed of a plurality of processing and learning elements, each of said first layer processing elements being connected to all of said second layer processing and learning elements for fanning out said sensed signal and said phase shifted sensed signal to all of the processing and learning elements of said second layer means, each processing and learning elements of said second layer means being capable of selecting out and learning different segments of the sensed signal in accordance with a predetermined competitive learning rule that partitions the signal into said different segments.

2. The system of claim 1 further comprising:
   a third layer means composed of a plurality of processing elements connected to said second layer means for processing said different segments to identify a desired characteristic of the emanated signal.

3. The system of claim 1 wherein said transmitting means includes:
   first and second conductive leads connecting said each sensing means with said processing elements of said first layer means; and
   a signal delay producing device disposed in one of said leads.

4. The system of claim 1 wherein said competitive learning rule is a modified Kohonen competitive learning rule in accordance with the expression:

$$W_i^{new} = W_i^{old} + \alpha(x_{ik} - c_{ik}) \wedge d_{ik}$$

where $W_i$ is the weight plane, expressed as a bi-vector, of the ith PE of layer 2, $\alpha$ is the learning rate, $d_{ik} = \overline{x_k} \cdot W_i$ the bar denotes normalization, $c_{ik}$ is the projection of $x_k$ onto $W_i$, normalized to unit length, and the symbol $\wedge$ denotes the wedge product 5. A signal phase sensitive neural network system, comprising:
   (a) a plurality of means for sensing a signal emanating from an environment of interest;
   (b) a first layer means composed of a plurality of processing elements connected to said plurality of sensing means for receiving inputs representative of said sensed signal; and
   (c) a second layer means composed of a plurality of processing and learning elements, each of said processing elements of said first layer means being connected to all of said processing and learning elements of said second layer means for fanning out said inputs to all of the processing and learning elements, each of said processing and learning elements being capable of selecting out and learning different segments of the signal in accordance with a predetermined competitive learning rule that partitions the signal into said different segments, said competitive learning rule being a modified Kohonen competitive learning rule in accordance with the expression:

$$W_i^{new} = W_i^{old} + \alpha(x_{ik} - c_{ik}) \wedge d_{ik}$$

where $W_i$ is the weight plane, expressed as a bi-vector, of the ith PE of layer 2, $\alpha$ is the learning rate, $d_{ik} = \overline{x_k} \cdot W_i$ the bar denotes normalization, $c_{ik}$ is the projection of $x_k$ onto $W_i$, normalized to unit length, and the symbol $\wedge$ denotes the wedge product.

6. The system of claim 5 further comprising:

a third layer means composed of a plurality of processing elements connected to said processing and learning elements of said second layer means for processing the different signal segments into identify a desired characteristic of the emanated signal.

7. A signal phased sensitive neural network method, comprising the steps of:
(a) sensing a signal emanating from an environment of interest;
(b) transmitting pairs of the sensed signal to each pair of a plurality of pairs of processing elements of a first layer thereof such that the signals of the sensed signal pair of substantial duplicates except that one is phase shifted by a predetermined amount relative to the other;
(c) fanning out the sensed signal pair from the first layer processing elements to each of a plurality of processing and learning elements of a second layer; and
(d) selecting out and learning different segments of the emanated signal, from the sensed signal pair at the second payer of processing and learning elements, in accordance with a predetermined competitive learning rule for partitioning the signal into the different segments.

8. The method of claim 7 wherein said competitive learning rule is a modified Kohonen competitive learning rule in accordance with the expression:

$$W_i^{new} = W_i^{old} + \alpha(x_{ik} - c_{ik}) \wedge d_{ik}$$

where $W_i$ is the weight plane, expressed as a bi-vector, of the ith PE of layer 2, $\alpha$ is the learning rate, $d_{ik} = \overline{x_k \cdot W_i}$ the bar denotes normalization, $c_{ik}$ is the projection of $x_k$ onto $W_i$, normalized to unit length, and the symbol $\wedge$ denotes the wedge product.

9. The method of claim 7 further comprising:
transmitting the different signal segments from the second layer processing and learning elements to a plurality of processing elements of a third layer; and
processing the different signal segments at the third layer to identify a desired characteristic of the emanated signal.

10. A signal phase sensitive neural network method, comprising the steps of:
(a) sensing a signal emanating from an environment of interest;
(b) transmitting inputs of the sensed signal to each of a plurality of processing elements of a first layer;
(c) fanning out the inputs from the first layer processing elements to each of a plurality of processing and learning elements of a second layer; and
(d) selecting out and learning different segments of the signal, form the inputs at the second layer, in accordance with a predetermined competitive learning rule for partitioning the signal into the different segments, said competitive learning rule being a modified Kohonen competitive learning rule in accordance with the expression:

$$W_i^{new} = W_i^{old} + \alpha(x_{ik} - c_{ik}) \wedge d_{ik}$$

where $W_i$ is the weight plane, expressed as a bi-vector, of the ith PE of layer 2, $\alpha$ is the learning rate, $d_{ik} = \overline{x_k \cdot W_i}$ the bar denotes normalization, $c_{ik}$ is the projection of $x_k$ onto $W_i$, normalized to unit length, and the symbol $\wedge$ denotes the wedge product.

* * * * *